United States Patent
Han et al.

(10) Patent No.: US 10,232,290 B2
(45) Date of Patent: Mar. 19, 2019

(54) MULTISTAGE COMPLEX WATER SCREEN FILTER WITH AUTOMATIC ALARM IN MICRO-IRRIGATION AND ITS COMPOSITION METHOD

(71) Applicant: Farmland Irrigation Research Institute, CAAS, Xinxiang (CN)

(72) Inventors: Qibiao Han, Xinxiang (CN); Xiuqiao Huang, Xinxiang (CN); Hao Sun, Xinxiang (CN); Fuyi Duan, Xinxiang (CN); Junjie Feng, Xinxiang (CN); Hao Li, Xinxiang (CN)

(73) Assignee: Farmland Irrigation Research Institute, CAAS, Xinxiang (CN)

( * ) Notice: Subject to any disclaimer, the term of this patent is extended or adjusted under 35 U.S.C. 154(b) by 157 days.

(21) Appl. No.: 15/620,841

(22) Filed: Jun. 13, 2017

(65) Prior Publication Data

US 2017/0368483 A1 Dec. 28, 2017

(30) Foreign Application Priority Data

Jun. 28, 2016 (CN) .......................... 2016 1 0509738

(51) Int. Cl.
*B01D 29/64* (2006.01)
*A01G 25/00* (2006.01)
(Continued)

(52) U.S. Cl.
CPC .......... *B01D 29/6415* (2013.01); *A01G 25/00* (2013.01); *B01D 29/33* (2013.01); *B01D 29/58* (2013.01); *B01D 29/606* (2013.01); *B01D 35/1435* (2013.01); *B01D 2201/08* (2013.01); *B01D 2201/304* (2013.01);
(Continued)

(58) Field of Classification Search
CPC .......... B01D 2201/08; B01D 2201/304; B01D 2201/305; B01D 2201/56; B01D 2201/58; B01D 29/33; B01D 29/58; B01D 29/606; B01D 29/6415; B01D 35/1435; A01G 25/00
See application file for complete search history.

(56) References Cited

U.S. PATENT DOCUMENTS 2,652,153 A * 9/1953 Perrault .............. B01L 329/117
210/355

FOREIGN PATENT DOCUMENTS

CN 201012310 Y * 1/2008
CN 204017515 U 12/2014
(Continued)

*Primary Examiner* — Terry K Cecil
(74) *Attorney, Agent, or Firm* — Gokalp Bayramoglu (57) ABSTRACT

The present invention relates to a self-alarm multi-stage complex screen filter for micro-irrigation and the assembly method thereof. The filter comprises a housing, an alarm, a multi-stage screen filtering element, and a segmented brush. The housing comprises a left housing, a middle housing, and a right housing. The multi-stage screen filtering element comprises a plurality of screen filter cylinders. The segmented brush comprises a plurality of bristle frames, a plurality of connecting rods, a connector and a power device. The middle housing is provided with a water inlet. The left housing is provided with a discharge pipe. The installation, disassembly, repair, maintenance of the filter of the present invention can be done more conveniently.

20 Claims, 8 Drawing Sheets

(51) Int. Cl.
 B01D 29/60 (2006.01)
 B01D 29/33 (2006.01)
 B01D 29/58 (2006.01)
 B01D 35/143 (2006.01)

(52) U.S. Cl.
 CPC .... *B01D 2201/305* (2013.01); *B01D 2201/56* (2013.01); *B01D 2201/58* (2013.01)

(56) References Cited

FOREIGN PATENT DOCUMENTS

CN 204745809 U 11/2015
GB 2294887 A * 5/1996 ........... B01D 29/118

\* cited by examiner

MULTISTAGE COMPLEX WATER SCREEN FILTER WITH AUTOMATIC ALARM IN MICRO-IRRIGATION AND ITS COMPOSITION METHOD

CROSS REFERENCE TO RELATED APPLICATIONS

This application claims the benefit and priority to Chinese Patent Application No. 201610509738.X, filed on Jun. 28, 2016, the entire contents of which are incorporated herein by reference.

TECHNICAL FIELD

The present invention relates to the field of farm irrigation, more particularly to a self-alarm multi-stage complex screen filter for micro-irrigation and an assembly method thereof.

BACKGROUND

A filter is the key device for a micro-irrigation system and has an important influence on the irrigation quality and the safety of operation. The screen filter has a simple structure and is easy to operate, and thereby is highly favored by farmers. However, the current screen filtering technology has following issues. (1) During filtering, impurities may form a filter cake on the screen filter. If not flushed timely, the pressure difference of the filter and energy consumption will increase. Since farmers usually need to work in the field dining irrigation, they cannot always watch over the filter. The problem of the timing to flush, forewarn, warn, and alert farmers needs to be dealt with. (2) The micro-irrigation system often needs a multi-stage filtration to ensure the accuracy and flow of the filtration. Currently, the multi-stage filtration generally uses a mode in which multiple filters are connected in series. Undoubtedly, such mode occupies a large space and requires lots of pipe connections, and thus is costly and increases the energy consumption of the micro-irrigation system. (3) In the filter screen cleaning process of the conventional screen filter, water supply to the micro-irrigation system needs to be stopped, or a filter device should be connected in parallel. There is a need to ensure that the micro-irrigation system does not stop working during the cleaning process. A Chinese patent (201420455391.1) mentions a filter cleaning warning device using a buzzer or the like. This device solves the problem of cleaning warning to a certain extent, but only achieves the nearby warning. For example, if the farmer is far away from the filter, it is difficult for the farmer to hear the alarm. This device can only achieve the function of warning rather than forewarning. Another Chinese patent (201520487335.0) mentions a two-stage manual cleaning filter for irrigation, which has a double-layer filter. However this device has the following disadvantages. First, at most two layers of filters can be provided and this does not necessarily meet user's requirements. Second, the structure is complicated and difficult to install and disassemble. Mass productions and assembly of this device is hard to achieve. The repair and maintenance of the device is not convenient as well. Third, the hand brush and the secondary outfall are combined, without clarifying the connecting manner of the hand brush. Fourth, there are two outfalls, which need to be turned on separately and sequentially during the flushing, and thus the efficiency is low.

Based on the above reasons, it is required to develop a self-alarm multi-stage complex screen filter for micro-irrigation, which is easy to install and disassemble, is convenient in use, can achieve the function of forewarning and warning of cleaning, can further lower the energy consumption of the filtration, improves the space utilization of the head junction of the micro-irrigation, and ensures continuous water supply of the micro-irrigation system when the filter screen is being cleaned.

SUMMARY OF THE INVENTION

The present invention provides a self-alarm multi-stage complex screen filter for micro-irrigation and an assembling method thereof, which solves the problem that the conventional filter occupies a large space and is inconvenient to clean and the alarm is not timely or accurate.

To solve the above technical problem, the present invention provides the following technical solutions.

A self-alarm multi-stage complex screen filter for micro-irrigation comprises a housing, an alarm, a multi-stage screen filtering element, and a segmented brush. The housing is segmented and comprises a left housing, a middle housing, and a right housing (from left to right). The left housing, the middle housing, and the right housing are connected through band clamps in a sealing manner. The left housing is provided with a water outlet. The inner surface of the left housing is provided with a plurality of locking grooves. The multi-stage screen filtering element comprises a plurality of screen filter cylinders. The open end of each screen filter cylinder is provided with a snap ring fitting with the locking groove. The screen filter cylinders are rotatably fitted within the locking grooves. The segmented brush comprises a plurality of bristle frames, a plurality of connecting rods, a connector and a power device. The number of the bristle flames is the same as that of the screen filter cylinders. The bristle frames are provided with single-sided bristle clusters. The single-sided bristle clusters contact the outer surface of the screen fillet cylinders from outside to inside. The connecting rods pass through the screen filter cylinders and are connected with the connector. The connecting rod passes through the right housing and is connected to the power device. The middle housing is provided with a water inlet. A differential pressure gauge is provided between the water inlet and the water outlet. The differential pressure gauge is connected to a PLC controller. The PLC controller is provided with the alarm and an indicating light. The left housing is provided with a discharge pipe. The discharge pipe is provided with a one-way valve.

Further, in a preferred embodiment of the present invention, the snap ring has a protrusion, and the locking groove is provided with a recess which fits with the protrusion.

Further, in a preferred embodiment of the present invention, an annular gasket is provided in the locking groove.

Further, in a preferred embodiment of the present invention, the bristle frame is provided with double-sided bristle clusters, the bristle cluster on one side of an outermost double-sided bristle cluster contact the outer surface of the screen filter cylinder, the bristle cluster on the other side of the outermost double-sided bristle cluster contact an inner surface of the housing, the bristle cluster on one side of another double-sided bristle cluster contact an inner surface of an upper level screen filter cylinder, the bristle cluster on the other side of the another double-sided bristle cluster contact an inner surface of a lower level screen filter cylinder.

Further, in a preferred embodiment of the present invention, the connector comprises a threeway connector, a four-way connector, and a two-way connector, the number of the four-way connector is one less than that of the screen filter cylinders.

Further, in a preferred embodiment of the present invention, 30%-50% of the bristle cluster are long bristles, the long bristles correspond to a position of a filtering hole of the screen filter cylinder.

Further, in a preferred embodiment of the present invention, the PLC controller is provided with a wireless communication module.

Further, in a preferred embodiment of the present invention, the power device is a hand crank, which is connected to the connecting rod.

Further, in a preferred embodiment of the present invention, the power device is a direct current motor, which is connected to the connecting rod and the PLC controller.

An assembly method of the self-alarm multi-stage complex screen filter for micro-irrigation comprises the following steps.

(1) The innermost-layer screen filter cylinder is fixed the locking groove by rotationally fitting the snap ring.

(2) The innermost-layer bristle frame is fixed to a connecting rod through the three-way connector.

(3) The connecting rod is passed through the next-layer screen filter cylinder, which is fixed in the locking groove by rotationally fitting the snap ring.

(4) The next-layer bristle frame is fixed to the connecting rod through the four-way connector.

(5) Step (3) and step (4) are repeated, until all the screen filter cylinders and bristle frames are installed.

(6) The left housing is fixed to the middle housing through the band clamp.

(7) The connecting rod is passed through the right housing and fixing the middle housing to the right housing through the band clamp.

(8) The connecting rod is connected to the power device through the two-way connector.

(9) Rest parts are assembled to finish the assembly of the self-alarm multi-stage complex screen filter for micro-irrigation.

The beneficial effects of the present invention are as follows.

(1) The installation, disassembly, repair, and maintenance of the filter can be done more conveniently. The housing of the filter can be assembled and connected with band clamps. The filtering element has multiple stages and can be quickly mounted on the left housing of the housing. The screen brushes are assembled in segments and can be assembled stage by stage, in the same way as that of the multi-stage screen filtering element.

(2) The number of stages can beincreased, if necessary, to achieve multi-stage complex filtration. The number of stages can be continuously increased according to the demand of the filtration merely by increasing the number of screen filtering elements. During the flushing, all the water will converge at one drain outlet. The operation is easy. A one-way valve is provided such that the water in filtering elements of different stages will not be mixed.

(3) Remote forewarning and warning are achieved. The indication of time for flushing the filter will be simple and fast. The alarm is provided such that the pressure difference between inlet pipe and outlet pipe of the filter can be monitored in real time. The forewarning and warning can be performed according, to the threshold set up by the user. Communication with mobile terminals through Internet of Things is enabled. The remote transmission function is realized. There is no need to watch over the head junction of the micro-irrigation.

In summary, in the self-alarm hand crank multi-stage complex screen filter for micro-irrigation, multiple stages of filter screens are arranged in a housing such that the space in the head junction of the micro-irrigation system is saved and the number of pipe connections is reduced. The cost and operational energy consumption of the head junction of the micro-irrigation system are further reduced. The installation is convenient and the operation is easy. In the flushing process, there is no need to stop the irrigation. No full-time staff to watch over the system is necessary. Compared with traditional technical solution, the present invention has significant advantages and benefits.

BRIEF DESCRIPTION OF THE DRAWINGS

In order to illustrate the embodiments of the present invention or the technical solutions in the prior art more clearly, accompanying drawings which are required in the description of the embodiments or prior arts will be briefly introduced hereinafter. Apparently, the drawings only show some embodiments of the present invention. Those of ordinary skill in the art can obtain other drawings from these drawings without creative efforts.

In the drawings: 1. main discharge pipe, 2. first discharge branch pipe, 3, second discharge branch pipe, 4. third discharge branch pipe, 5. water outlet, 6. third screen filter cylinder, 7. second screen filter cylinder, 8. first screen filter cylinder, 9. differential pressure gauge, 10. alarm, 11. PLC controller, 12. indicating light, 13. water inlet, 14. single-sided bristle cluster, 15. first bristle frame, 16. second bristle frame, 17. bracket, 18. third bristle frame, 19. one-way valve, 20. left housing, 21. middle housing, 22. band clamp, 23. right housing, 24. three-way connector, 25 connecting rod, 26. four-way connector, 27 two-way connector, 28. hand crank, 29. annular gasket, 30. snap ring, 31. locking groove, 32. double-sided bristle cluster, 33. short bristle, 34. long bristle, 35. cellphone, 36. wireless communication module, 37. direct current motor, 38. main valve.

DETAILED DESCRIPTION

Technical solutions of embodiments of the present invention will be clearly and completely described in conjunction with the accompanying drawings in the embodiments of the present invention. Obviously, the described embodiments are merely part of, rather than all embodiments of the present invention. Based on the embodiments of the present invention, all other embodiments obtained by those of ordinary skill in the art without creative work should fall within the scope of the present invention.

Embodiment 1

As shown in FIGS. 1-5, a self-alarm multi-stage complex screen filter for micro-irrigation comprises a housing, alarm 10, a multi-stage screen filtering element, and a segmented brush. Bracket 17 is provided at the lower part of the housing. The housing is segmented and comprises left housing 20, middle housing 21, and a right housing (sequentially from left to right). Left housing 20, middle housing 21, and right housing 22 are connected through band clamps 22 in a sealing manner. Left housing 20 is provided with water outlet 5. The inner surface of left housing 20 is provided with a plurality of locking grooves 31. The number and structure of locking grooves 31 can be provided according to actual situation, as long as the function of fixed snap-fit is realized. In the present embodiment, there are four locking grooves, which are disposed evenly.

The multi-stage screen filtering element comprises several screen filter cylinders. For micro-irrigation, generally, the number of the screen filter cylinders is less than three. In the present embodiment, three screen filter cylinders are used, i.e., first screen filter cylinder 8, second screen filter cylinder 7, and third screen filter cylinder 6. The number of meshes of the screen filter cylinders increase from outside to inside (generally, first screen filter cylinder 8 has 50 meshes, second screen filter cylinder 7 has 80 meshes, and third screen filter cylinder 6 has 120 meshes). The filtration accuracies increase from outside to inside. The filter cylinder is a cylinder. The radiuses of the filter cylinders decrease from outside to inside. The open end of each filter cylinder is provided with snap ring 30, which fits with locking groove 31. Each filter cylinder is rotationally locked onto locking groove 31 by snap ring 30.

The segmented brush comprises a plurality of bristle frames, a plurality of connecting rods 25, a plurality of connectors, and a power device. The number of the bristle frames is the same as that of the screen filter cylinders. In the present embodiment, there are three bristle frames, i.e., first bristle frame 15, second bristle frame 16, and third bristle frame 18. Each bristle frame is provided with single-sided bristle cluster 14. Single-sided bristle cluster 14 contacts the outer surfaces of first screen filter cylinder 8, second screen filter cylinder 7, and third screen filter cylinder 6, respectively, from outside to inside. Connecting rods 25 sequentially pass through second screen filter cylinder 7 and first screen filter cylinder 8 and are connected to each other by the connectors. Connecting rod 25 passes through right housing 23 and is connected to the power device. In the present embodiment, the power device is hand crank 28, which is connected to connecting rod 25.

Middle housing 21 is provided with water inlet. 13. Differential pressure gauge 9 is provided between water inlet. 13 and water outlet 5. Differential pressure gauge 9 is connected to PLC controller 11. PLC controller 11 is provided with alarm 10 and indicating light 12. Alarm 10 is an acousto-optic alarm.

Left housing 20 is provided with a discharge pipe corresponding to the bristle frame. The discharge pipe is provided with three discharge branch pipes and a main discharge pipe 1. That is, first discharge branch pipe 2 is disposed between the housing and first screen filter cylinder 8, second discharge branch pipe 3 is disposed between the first and second screen filter cylinders, and third discharge branch pipe 4 is disposed between the second and third screen filter cylinders. Three discharge branch pipes merge into main dispose pipe 1. In order to prevent flow communication and cross-contamination, each discharge branch pipe is provided with one-way valve 19.

In the present embodiment, three filter cylinders are provided in a filtering chamber. The requirement of micro-irrigation filtration is met and the occupied area is effectively reduced. In addition, the housing is designed to have three segments to facilitate the installation at the filter cylinder and the brush such that the entire installation process is convenient and fast. Moreover, the utilization of segmented brush achieves the targeted decontamination for each filter cylinder, which is efficient and convenient.

Figure 4:
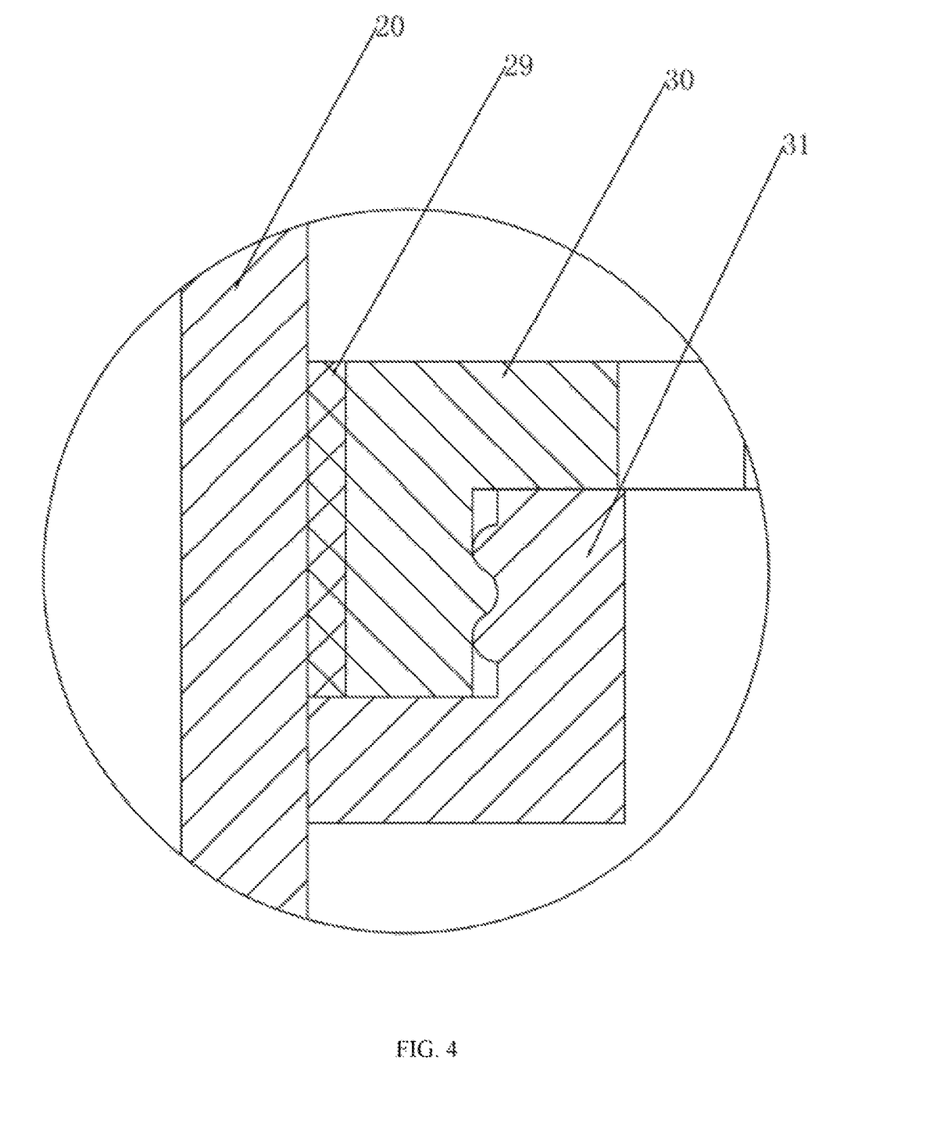
FIG. 4 is an enlarged view of portion A in FIG. 1.
Figure 5:
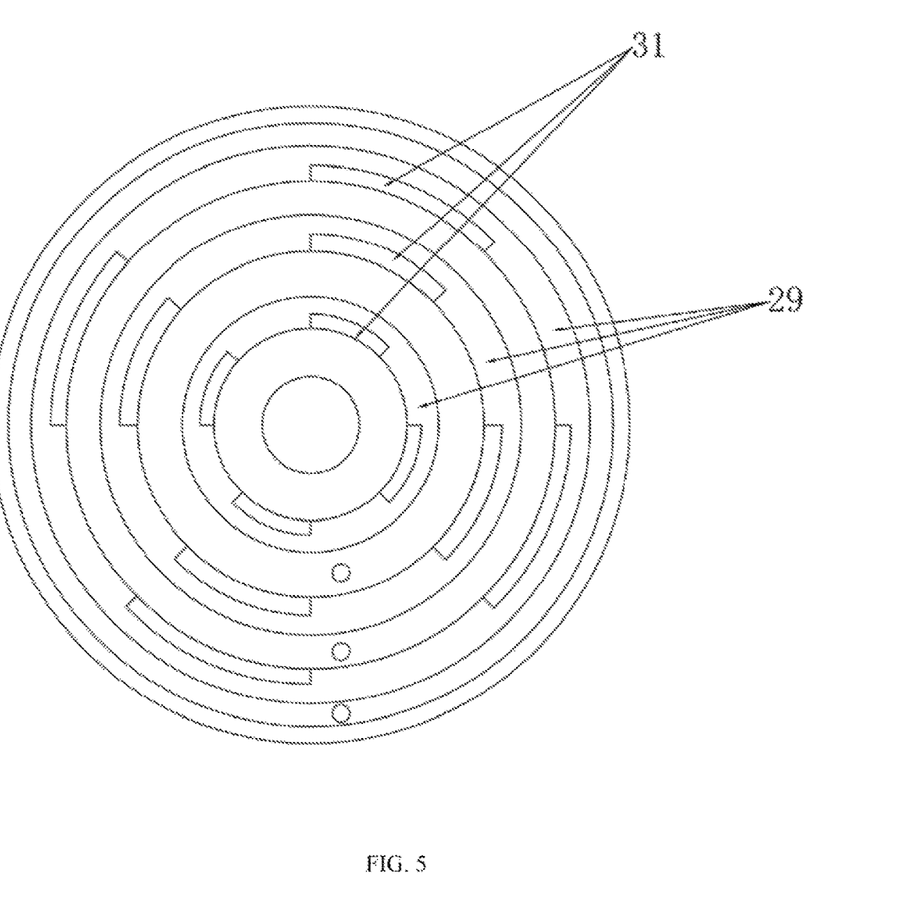
FIG. 5 is a structural schematic diagram of a locking groove and an annular gasket.

Preferably, snap ring 30 has a protrusion, and locking groove 31 is provided with a recess which fits with the protrusion. With the protrusion-recess structure, the filter cylinder can be turn-locked onto left housing 20 firmly and the stability of the filtration process is increased.

Preferably, annular gasket. 29 is provided in locking groove 29. Annular gasket 29 is used to seal snap ring 30 and can effectively prevent water from flowing between snap ring 30 and locking groove 31 so as to improve the effect of filtration.

Figure 3:
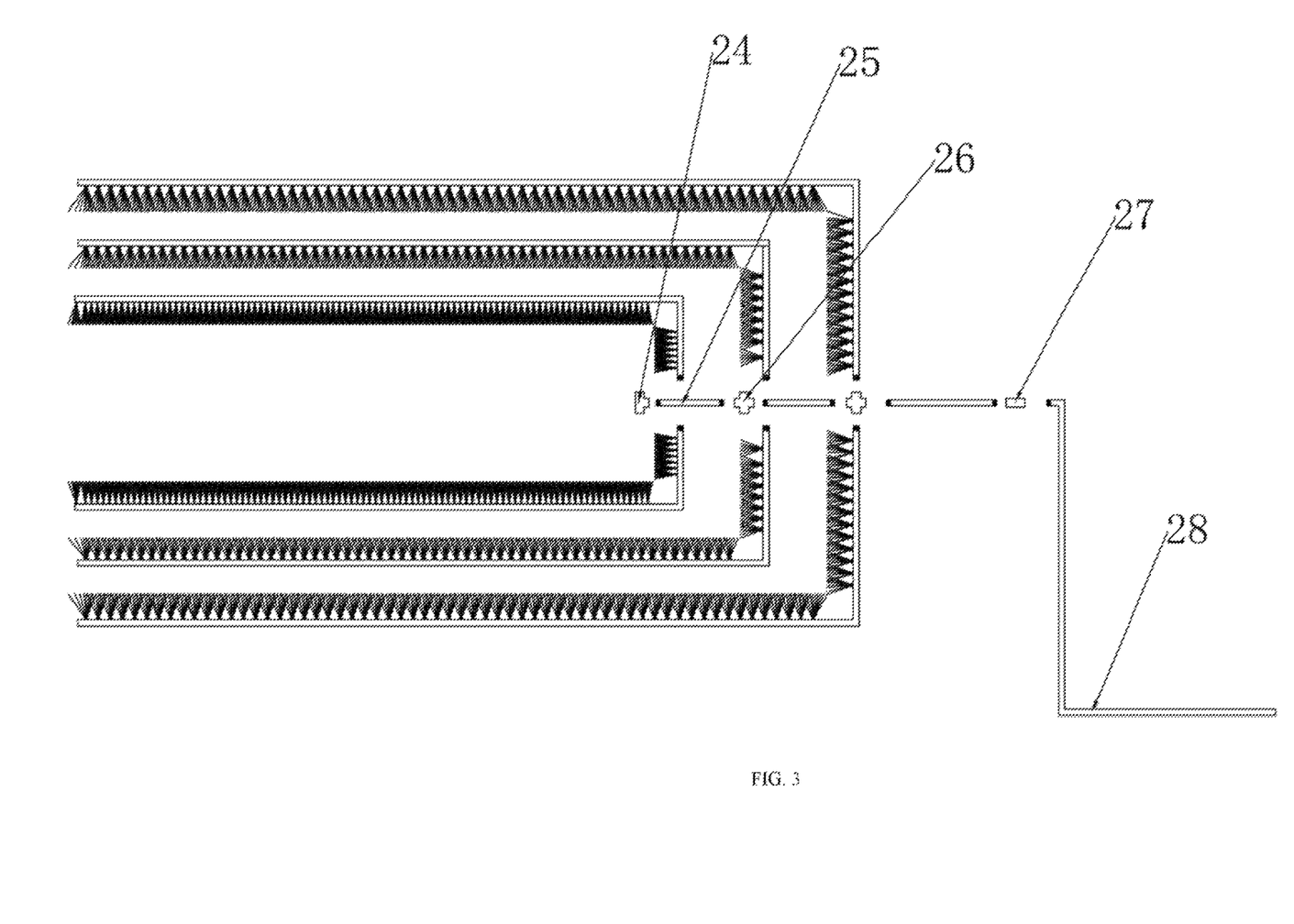
FIG. 3 is a structural schematic diagram of a segmented brush of the present invention.

Preferably, the plurality of connectors comprise three-way connector 24, four-way connector 26, and two-way connector 27. The number of four-way connector 24 is one less than that of the screen filter cylinders. The connector is used to fixedly connect the bristle frame to connecting rod 25 so as to achieve the fast and easy assembly of the segmented brush. Any structure that can achieve this function can be used. In this embodiment, a structure with multiple threaded connectors is used. On one hand, it is easy to assemble and disassemble the threaded structure. On the other hand, the threaded connection is versatile and easy to manufacture.

Figure 1:
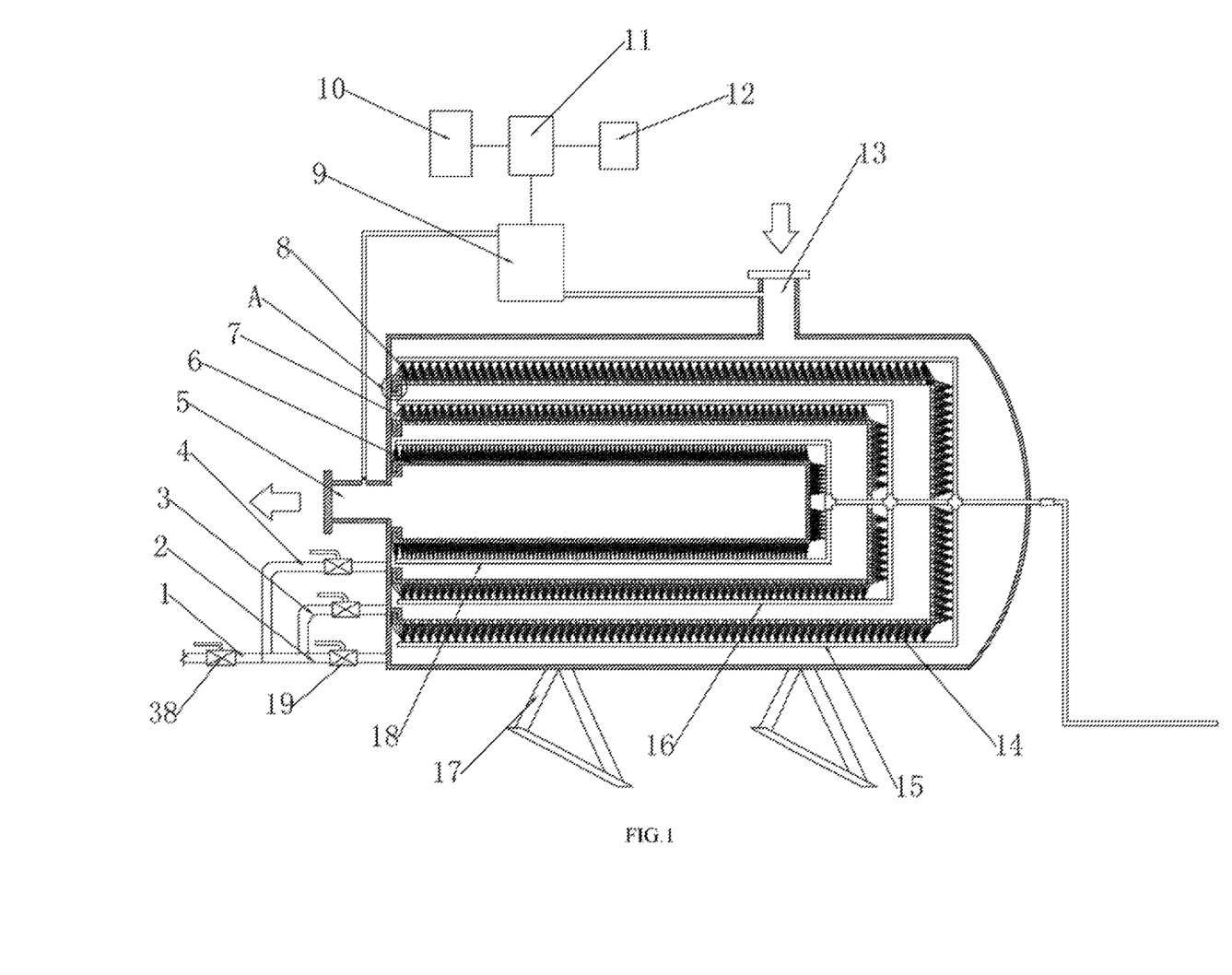
FIG. 1 is a cross-sectional structural schematic diagram of an embodiment of the present invention.
Figure 2:
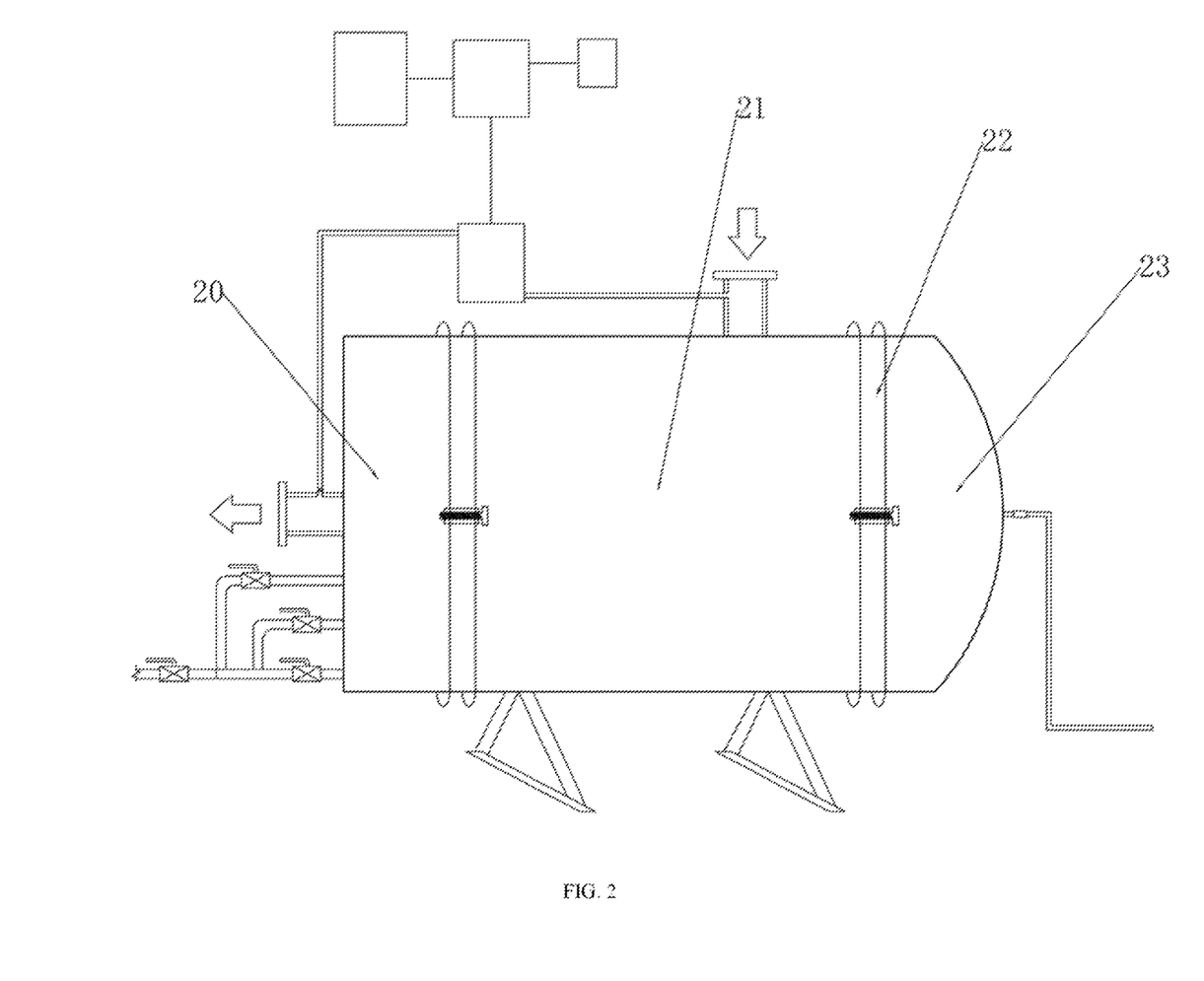
FIG. 2 is a planar structural schematic diagram of an embodiment of the present invention.

The operation is as follows. After the forewarning pressure and the warning pressure are set by PLC controller 11, the filter starts running and the farmer sets out for work. When the pressure reaches the forewarning pressure, alarm 10 is triggered. When receiving the alarm signal via sound and light, the farmer returns to the head junction of the micro-irrigation system. When the pressure reaches the warning pressure, indicating light 12 lights up, and main valve 38 of the discharge pipe is turned on. The handle can be cranked to clean the filter screen. After the pressure returns to normal, the valve of the discharge pipe is turned off and the filter continues to work.

Embodiment 2

Figure 6:
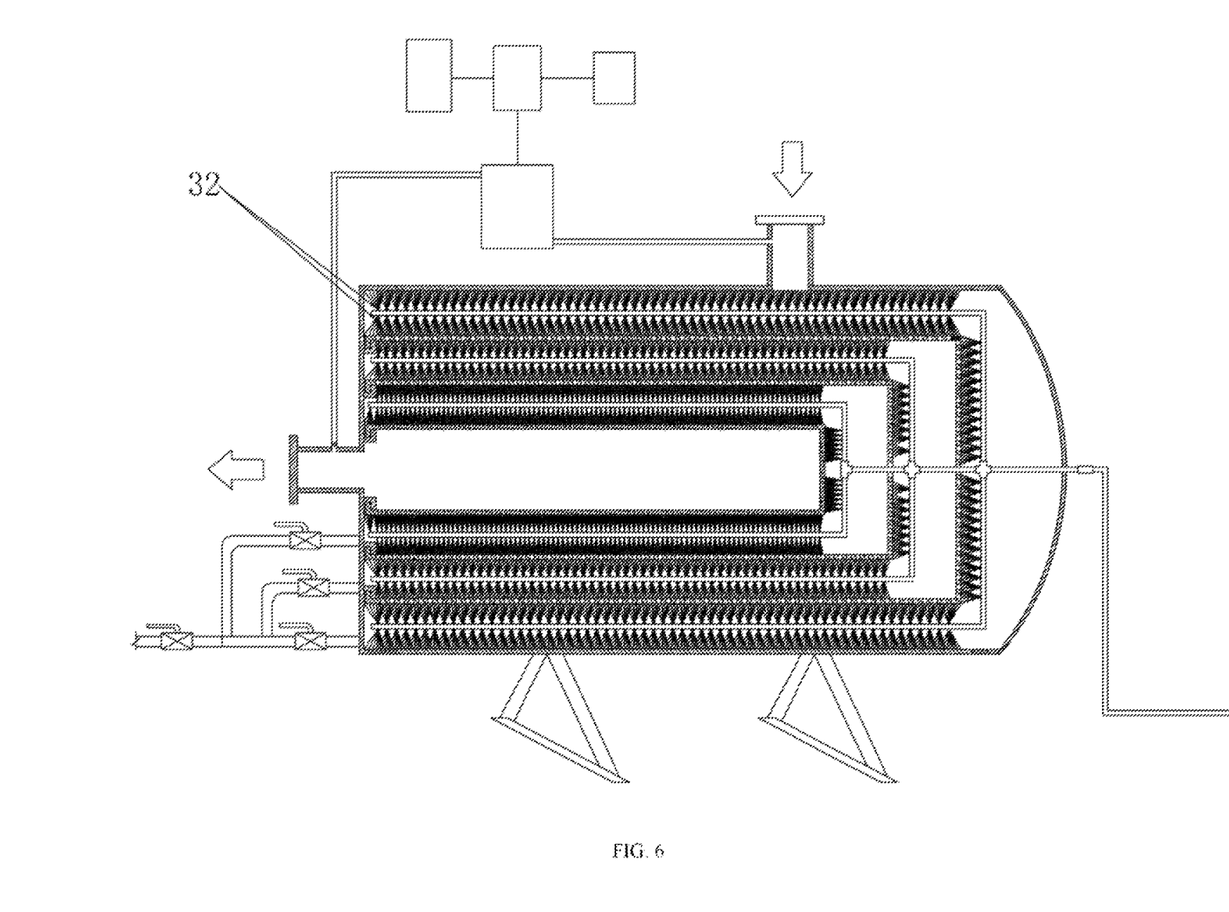
FIG. 6 is a cross-sectional structural schematic diagram of another embodiment of the present invention.

As shown in FIG. 6, Embodiment 2 is substantially the same as Embodiment 1, except that the bristle frame is provided with double-sided bristle cluster 32. The bristle cluster on one side of the outermost double-sided bristle cluster 32 contacts the outer surface of the screen filter cylinder, while the bristle cluster on the other side of, the outermost double-sided bristle cluster 32 contacts an inner surface of the housing. The bristle cluster on one side of other double-sided bristle cluster 32 contacts an inner surface of an upper level screen filter cylinder, while the bristle cluster on the other side of other double-sided bristle cluster 32 contacts an inner surface of a lower level screen filter cylinder. Particularly in the present embodiment, double-sided bristle cluster 32 has three layers. The bristle cluster on one side of the outermost double-sided bristle cluster 32 contacts the outer surface of first screen filter cylinder 8, while the bristle cluster on the other side of the outermost double-sided bristle cluster 32 contacts an inner surface of the housing. The bristle cluster on one side of the middle double-sided bristle cluster 32 contacts the inner surface of first screen filter cylinder 8, while the bristle cluster on the other side of the middle double-sided bristle cluster 32 contacts the outer surface of second screen filter cylinder 7. The bristle cluster on one side of the innermost double-sided bristle cluster 32 contacts the inner surface of second screen filter cylinder 7, while the bristle cluster on the other side of the innermost double-sided bristle cluster 32 contacts the outer surface of third screen filter cylinder 6. With the structure of double-sided bristle cluster 32, the inside of the filter can be completely cleaned and decontaminate. This structure can be applied to the place where the irrigation water has a high content of impurity. As a more preferred embodiment, a bristle frame can be provided in the innermost filter cylinder, and single-sided bristle cluster 14 is provided on the bristle frame. In addition, a discharge branch pipe is provided on left housing 20 of the corresponding filter cylinder to achieve the cleaning and decontamination of the inner surface of the filter cylinder.

Embodiment 3

Figure 7:
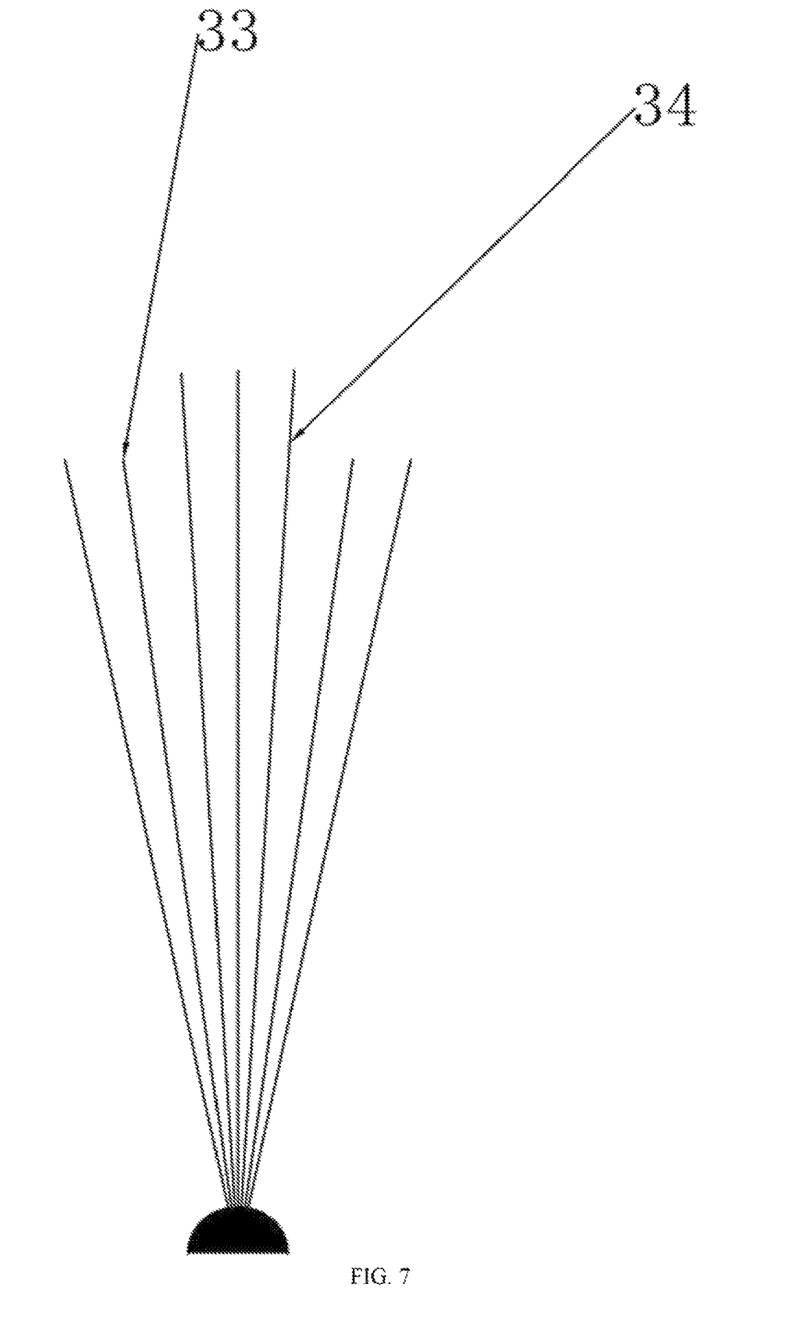
FIG. 7 is a structural schematic diagram of bristles of an embodiment of the present invention.

As shown in FIG. 7, Embodiment 3 is substantially the same as Embodiment 2, except that 30%-50% of the bristle cluster are long bristle 34 and long bristle 34 correspond to a position of a filtering hole of the screen filter cylinder. Long bristle 34 is provided in the bristle cluster. Compared with short bristle 33, the extra length of long bristle 34 is equal to or slightly less than the depth of the filtering hole. With the structure in which long bristle 34 and short bristle 33 work together, the surface of the filter cylinder and the surface of the filtering hole can be cleaned efficiently so as to improve the cleaning effect and the filtering efficiency.

Embodiment 4

Figure 8:
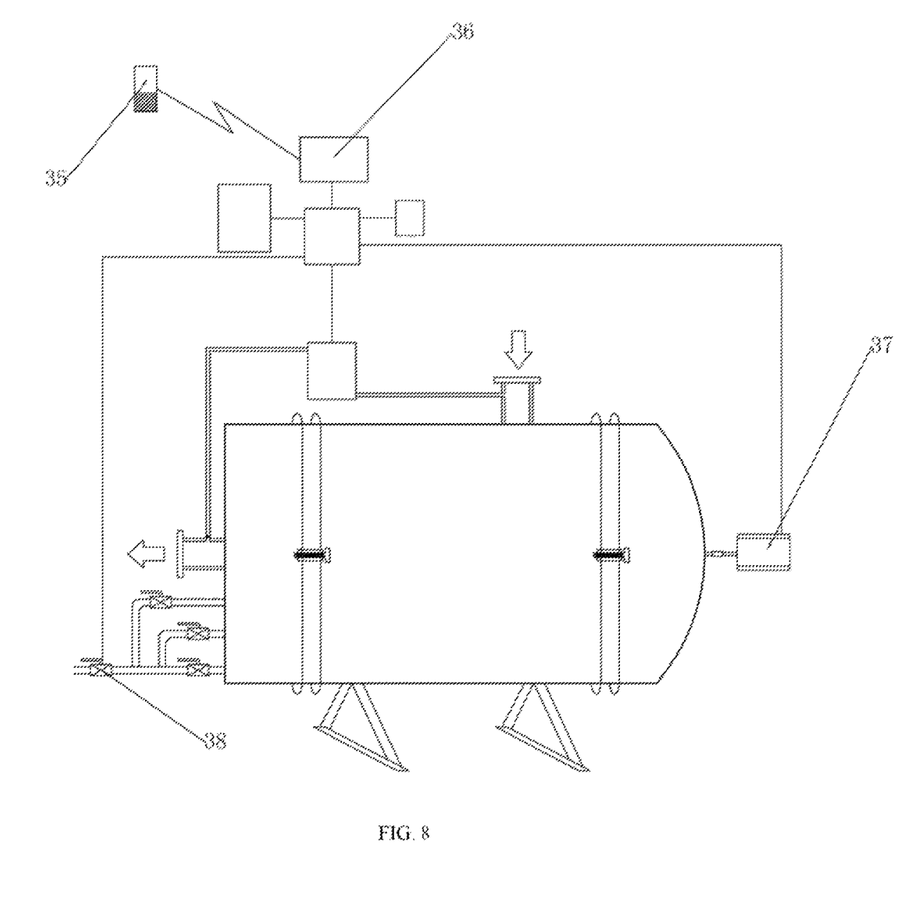
FIG. 8 is a planar structural schematic diagram of a further embodiment of the present invention.

As shown in FIG. 8, Embodiment 4 is substantially the same as Embodiment 1, except that PLC controller 11 is provided with wireless communication module 36. The power device is DC motor 37, which is connected to connecting rod 25 and PLC controller 11. Main valve 38 of main discharge pipe 1 is connected to PLC controller 11. With wireless communication module 36, the signal received by PLC controller 11 can be transmitted to the signal receiving terminal, such as cellphone 35 and so on, to achieve remote monitoring. DC motor 37 is used to provide power. Rechargeable DC power supply is used as the power supply.

The operation is as follows. After the forewarning pressure, the warning pressure, and the motor speed are set by PLC controller 11, the filter starts running after the and the farmer sets out for work. When the pressure reaches the forewarning pressure, alarm 10 is triggered. The alarm signal is sent to cellphone 35 of the farmer by wireless communication module 36. When the pressure reaches the warning pressure, the indicating light lights up, and PLC controller 11 sends the signal to turn on main valve 38 on the main the discharge pipe 1 and DC motor 37. DC motor 37 drives the segmented brush to rotate to clean the filter screen. After the pressure returns to normal, PLC controller 11 sends the signal to turn off the valve on the main discharge pipe of the discharge pipe and DC motor 37, and the filter continues to work. In the entire operation process, wireless communication module 36 sends signals of the forewarning pressure, the warning pressure, the ON/OFF of the motor, ON/OFF of the main valve on main discharge pipe 1 to cellphone 35 of the farmer in real time such that the farmer can remotely monitor the operation of the filter.

Embodiment 5

Taking the structure of Embodiment 1 as an example, an assembly method of the self-alarm multi-stage complex screen filter for micro-irrigation comprises the following steps.

(1) Third screen filter cylinder 6 is fixed in locking groove 31 by rotationally fitting in the snap ring.

(2) The third bristle frame is fixed to connecting rod 25 through three-way connector 24.

(3) Connecting rod 25 passes through second screen filter cylinder 7, which is fixed in locking groove 31 by rotationally fitting in the snap ring.

(4) The second bristle frame is fixed to connecting rod 25 through four-way connector 26.

(5) Connecting rod 25 passes through first screen filter cylinder 8, which is fixed in locking groove 31 by rotationally fitting in the snap ring.

(6) The first bristle frame is fixed to connecting rod 25 through four-way connector 26.

(7) Left housing 20 is fixed to middle housing 21 through band clamp 22.

(8) Connecting rod 25 passes through right housing 23 and fixed to middle housing 21 to right housing 23 through band clamp 22.

(9) Connecting rod 25 is connected to hand crank 28 through two-way connector 27.

(10) Differential pressure gauge 9, PLC controller 11, alarm 10, and one-way valve 19, etc., are installed to finish the assembly of the self-alarm multi-stage complex screen filter for micro-irrigation.

The installation of the present invention is simple and fast such that quick disassembly and replacement of the filter can be achieved.

The foregoing disclosure represents only preferred embodiments of the present invention and does not limit the present invention. Any modifications, equivalent substitutions, improvements within the spirit and principle of the present invention fall within the scope of the present invention.

What is claimed is:

1. A self-alarm multi-stage complex screen filter for micro-irrigation, comprising:
   a housing;
   an alarm;
   a multi-stage screen filtering element; and
   a segmented brush,
wherein
   the housing is segmented and comprises a left housing, a middle housing, and a right housing arranged from left to right;
   the left housing and the middle housing are connected to each other by a first band clamp in a sealing manner;
   the middle housing and the right housing are connected to each other by a second band clamp in a sealing manner;
   the left housing is provided with a water outlet; an inner surface of the left housing is provided with a plurality of locking grooves;
   the multi-stage screen filtering element comprises a plurality of screen filter cylinders;
   open ends of the screen filter cylinders are provided with snap rings fitting with the locking grooves;
   the snap rings of the screen filter cylinders are rotatably fitted in the locking grooves;

the segmented brush comprises a plurality of bristle frames, a plurality of connecting rods, a plurality of connectors, and a power device;
the number of the bristle frames is the same as that of the screen filter cylinders;
one side of each bristle frame is provided with a plurality of bristle clusters;
the bristle clusters contact outer surfaces of the screen filter cylinders from outside to inside in a concentric arrangement;
the connecting rods pass through the screen filter cylinder and are connected to each other by the plurality of connectors;
one of the plurality of connecting rods passes through the right housing and is connected to the power device;
the middle housing is provided with a water inlet;
a differential pressure gauge is provided between the water inlet and the water outlet;
the differential pressure gauge is connected to a PLC controller;
the PLC controller is provided with the alarm and an indicating light; and
the left housing is provided with a discharge pipe; the discharge pipe is provided with a one-way valve.

2. The self-alarm multi-stage complex screen filter for micro-irrigation according to claim 1, wherein
each snap ring has a protrusion; and
each locking groove is provided with a recess which fits with the protrusion.

3. The self-alarm multi-stage complex screen filter for micro-irrigation according to claim 2, wherein
the plurality of connectors comprises a three-way connector, a plurality of four-way connectors, and a two-way connector; and
the number of the four-way connectors is one less than that of the screen filter cylinders.

4. The self-alarm multi-stage complex screen filter for micro-irrigation according to claim 2, wherein
30%-50% of the plurality bristle clusters are long bristles; and
the long bristles correspond to a position of a filtering hole of the screen filter cylinder.

5. The self-alarm multi-stage complex screen filter for micro-irrigation according to claim 2, wherein the PLC controller is provided with a wireless communication module.

6. The self-alarm multi-stage complex screen filter for micro-irrigation according to claim 2, wherein the power device is a hand crank, which is connected to the connecting rod.

7. The self-alarm multi-stage complex screen filter for micro-irrigation according to claim 2, wherein the power device is a direct current motor, which is connected to the connecting rod and the PLC controller.

8. The self-alarm multi-stage complex screen filter for micro-irrigation according to claim 1, wherein an annular gasket is provided in each locking groove.

9. The self-alarm multi-stage complex screen filter for micro-irrigation according to claim 8, wherein
the plurality of connectors comprises a three-way connector, a plurality of four-way connectors, and a two-way connector; and
the number of the four-way connectors is one less than that of the screen filter cylinders.

10. The self-alarm multi-stage complex screen filter for micro-irrigation according to claim 8, wherein
30%-50% of the plurality bristle clusters are long bristles; and
the long bristles correspond to a position of a filtering hole of the screen filter cylinder.

11. The self-alarm multi-stage complex screen filter for micro-irrigation according to claim 8, wherein the PLC controller is provided with a wireless communication module.

12. The self-alarm multi-stage complex screen filter for micro-irrigation according to claim 8, wherein the power device is a hand crank, which is connected to the connecting rod.

13. The self-alarm multi-stage complex screen filter for micro-irrigation according to claim 8, wherein the power device is a direct current motor, which is connected to the connecting rod and the PLC controller.

14. The self-alarm multi-stage complex screen filter for micro-irrigation according to claim 1, wherein
both sides of each bristle frame is provided with a plurality of bristle clusters;
the bristle clusters on one side of an outermost bristle frame contacts the outer surface of an outermost screen filter cylinder, and the bristle clusters on the other side of the outermost bristle frame contacts an inner surface of the housing; and
the bristle clusters on one side of each bristle frame other than the outermost bristle frame contacts an inner surface of an upper-level screen filter cylinder, and the bristle clusters on the other side of each bristle frame other than the outermost bristle frame contacts an outer surface of a lower-level screen filter cylinder.

15. The self-alarm multi-stage complex screen filter for micro-irrigation according to claim 1, wherein
the plurality of connectors comprises a three-way connector, a plurality of four-way connectors, and a two-way connector; and
the number of the four-way connectors is one less than that of the screen filter cylinders.

16. The self-alarm multi-stage complex screen filter for micro-irrigation according to claim 1, wherein
30%-50% of the plurality bristle clusters are long bristles; and
the long bristles correspond to a position of a filtering hole of the screen filter cylinder.

17. The self-alarm multi-stage complex screen filter for micro-irrigation according to claim 1, wherein the PLC controller is provided with a wireless communication module.

18. The self-alarm multi-stage complex screen filter for micro-irrigation according to claim 1, wherein the power device is a hand crank, which is connected to the connecting rod.

19. The self-alarm multi-stage complex screen filter for micro-irrigation according to claim 1, wherein the power device is a direct current motor, which is connected to the connecting rod and the PLC controller.

20. An assembly method of a self-alarm multi-stage complex screen filter for micro-irrigation, comprising the following parts:
a housing;
an alarm;
a multi-stage screen filtering element; and
a segmented brush,
wherein
the housing is segmented and comprises a left housing, a middle housing, and a right housing arranged from left to right;

the left housing and the middle housing are connected to each other by a first band clamp in a sealing manner;

the middle housing and the right housing are connected to each other by a second band clamp in a sealing manner;

the left housing is provided with a water outlet; an inner surface of the left housing is provided with a plurality of locking grooves;

the multi-stage screen filtering element comprises a plurality of screen filter cylinders;

open ends of the screen filter cylinders are provided with snap rings fitting with the locking grooves;

the snap rings of the screen filter cylinders are rotatably fitted in the locking grooves;

the segmented brush comprises a plurality of bristle frames, a plurality of connecting rods, a plurality of connectors, and a power device;

the number of the bristle frames is the same as that of the screen filter cylinders;

one side of each bristle frame is provided with a plurality of bristle clusters;

the bristle clusters contact outer surfaces of the screen filter cylinders from outside to inside in a concentric arrangement;

the connecting rods pass through the screen filter cylinders and are connected to each other by the plurality of connectors;

one of the plurality of connecting rods passes through the right housing and is connected to the power device;

the middle housing is provided with a water inlet;

a differential pressure gauge is provided between the water inlet and the water outlet;

the differential pressure gauge is connected to a PLC controller;

the PLC controller is provided with the alarm and an indicating light; and the left housing is provided with a discharge pipe; the discharge pipe is provided with a one-way valve, wherein the assembly method comprises the following steps:

(1) fixing an innermost screen filter cylinder in the locking groove by rotationally fitting in the snap ring;

(2) fixing an innermost bristle frame to a connecting rod through a three-way connector, (3) passing the connecting rod through a next screen filter cylinder, which is fixed in the locking groove by rotationally fitting the snap ring;

(4) fixing a next bristle frame to the connecting rod through a four-way connector;

(5) repeating step (3) and step (4), until all the screen filter cylinders and all the bristle frames are installed;

(6) fixing the left housing to the middle housing through the first band clamp;

(7) passing the connecting rod through the right housing and fixing the middle housing to the right housing through the second band clamp;

(8) connecting the connecting rod to the power device through a two-way connector; and (9) assembling of the rest of the parts to complete the assembly of the self-alarm multi-stage complex screen filter for micro-irrigation.

\* \* \* \* \*